United States Patent Office 2,833,748
Patented May 6, 1958

2,833,748
NEW COPOLYMERS

Herbert K. Wiese, Cranford, and Winthrope C. Smith, Westfield, N. J., assignors to Esso Research and Engineering Company, a corporation of Delaware No Drawing. Application August 17, 1954
Serial No. 450,540

27 Claims. (Cl. 260—82.1)

This invention relates to the preparation of copolymers of unsaturated trichloro silanes and olefins, and more particularly relates to the preparation of copolymers of olefins and trichlorosilane derivatives of a cyclopentadiene.

It has already been proposed in application Serial No. 367,758, filed July 13, 1953, to prepare the trichlorosilane derivatives of cyclopentadienes by reacting the sodium salt of cyclopentadiene or its homologs, such as methyl cyclopentadiene, dimethyl cyclopentadiene with silicon tetrachloride at a temperature of −25° C. to +100° C. These compounds have the following general formula:

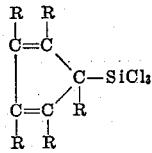

where R represents hydrogen substituents, usually methyl or other alkyl groups.

It has now been found that these cyclodienyl trichlorosilanes can be polymerized with 50–90% by weight of various unsaturated hydrocarbons, e. g. vinyl aromatics, such as styrene and its analogs, diolefins such as butadiene, isoprene, and olefins such as isobutylene, etc., alone or in combination. The reaction is carried out at temperatures ranging from −10° C. down to −164° C. by the application to the cold feed of a Friedel-Crafts type catalyst, preferably in solution in a low-freezing non-complex forming solvent.

For the catalyst, any of the catalysts disclosed by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used. It may be noted that while most of these catalysts are solids, a limited number are fluids including boron trifluoride which is a gas, and titanium tetrachloride which is a liquid. The fluid catalysts may be used directly as such or diluted for reaction control. The solid catalysts are preferably dissolved in an appropriate solvent.

For the solvent, any material which will dissolve a substantial amount, preferably more than approximately 0.1% of the Friedel-Crafts catalyst, has a freezing point below 0° C., thereby being low-freezing, and will boil away from the dissolved catalyst substance with a rise in temperature above the normal boiling point of the solvent of no more than 1 or 2 degrees, thereby being non-complex forming, is satisfactory. The preferred catalyst solvents are such substances as ethyl or methyl chloride, ethylene dichloride, chloroform, carbon disulfide, ethylidene fluoride, liquid ethylene, liquid ethane, liquid propane, liquid butane, and the like. These solvents are representative of a wide range of other substances, including the mono and poly halo aliphatic compounds, having freezing points below 0° C., the hydrocarbons which have freezing points below 0° C., and a considerable number of mixed solvents.

The advantages of the invention will be better understood from a consideration of the following experimental data which are given for the sake of illustration, but without intention of limiting the invention thereto.

*Example 1.*—A charge of 150 cc. $CH_3Cl$ at −60° C. and 2 g. cyclopentadienyl trichlorosilane and 20 g. isobutylene was made to a 3-inch diameter reactor. This was chilled and maintained at ∼−100° C. by external ethylene refrigeration. To this was added continuously with agitation over 6 minutes 50 cc. of a catalyst solution of 0.1 g. $AlCl_3$ dissolved in 100 cc. $CH_3Cl$ (at −60° C.). Polymer formed rapidly in a coarse slurry fouling only at the liquid interface near the end of the reaction. Then 3 cc. of a 1.17 g. $AlCl_3$ in 100 cc. $CH_3Cl$ concentrate was added effecting no further reaction indicating a catalyst efficiency of ∼440 g./g. assuming 100% conversion. The polymer was quenched and washed in isopropyl alcohol. It was not hot milled to avoid possible hydrolysis and condensation of unreacted cyclopentadienyl trichlorosilane. A 10 g. sample of this high molecular weight, tough polymer was squeezed to remove excess alcohol and dissolved in 600 cc. of cyclohexane. It was precipitated with acetone and the clear supernatant liquid discarded. This was repeated two more times to rid the polymer of unreacted cyclopentadienyl trichlorosilane. The silicon analysis showed 0.21 and 0.18 wt. percent Si in duplicate tests. This, calculated on the basis of the trichlorosilane form in the polymer, indicates 1.42 wt. percent cyclopentadienyl trichlorosilane in the polymer compared with 9.09 wt. percent cyclopentadienyl trichlorosilane in the feed. This gives a 15.5% utilization and a rough partition coefficient ($\alpha$) of 0.155. This polymer on standing at room temperature crosslinked to 100% insoluble ($CCl_4$, benzene, cyclohexane) polymer. Molecular weight and unsaturation could not be obtained.

*Example 2.*—Another series of polymers were made in a similar fashion employing 10, 20, 40 wt. percent cyclopentadienyl trichlorosilane on the isobutylene and 5/1 dilution with $CH_3Cl$.

| | (1) | (2) | (3) |
|---|---|---|---|
| Cyclopentadienyl trichlorosilane percent | 10 | 20 | 40 |
| $CH_3Cl$ cc | 150 | 300 | 300 |
| Cyclopentadienyl trichlorosilane g | 2 | 8 | 16 |
| Isobutene g | 20 | 40 | 40 |
| Catalyst: | | | |
| 0.1 g. $AlCl_3$ in 100 cc. $CH_3Cl$ cc | 50 | 75 | 130 |
| Time add'n min | 3 | 8 | 8.5 |
| Mol. Wt., Staud | 128,000 | 104,000 | 98,000 |
| Iodine Number | 2.74 | 2.75 | 3.47 |
| Silicon, wt. percent | 0.57 | 0.43 | 0.84 |
| Wt. percent in Polymer, Cyclopentadienyl trichlorosilane | 4.04 | 3.05 | 5.96 |
| | 44.5 | 18.3 | 20.8 |
| Utilization | 0.445 | 0.183 | 0.208 |

These polymers were prepared for evaluation by quenching and washing in absolute methyl alcohol to avoid hydrolysis cross linking and purified by a threefold precipitation from cyclohexane with dry acetone and vacuum dried at 70° C. and stored in a desiccator over $CaCl_2$. The unsaturation figures do not show changes in amount of cyclopentadienyl trichlorosilane in the polymer but the polymers of Example 1—10% cyclopentadienyl trichlorosilane in the feed and Example 2—283 at 20 and 40% cyclopentadienyl trichlorosilane in the feed show a regular progression of increasing silicon content which correlates with the cyclopentadienyl trichlorosilane in the feed stock.

Portions of these polymers were compounded in the following formulations and cured 60 minutes at 307° F.

Compound A:

| | Parts |
|---|---|
| Polymer | 100 |
| Carbon black | 50 |

Compound B:

| | |
|---|---|
| Polymer | 100 |
| Zinc oxide | 5.0 |
| Stearic acid | 1.0 |
| Sulfur | 2.0 |
| Carbon black | 50.0 |
| Tetramethyl thiuram disulfide | 1.0 |
| 2-mercapto-benzo-thiazole | 0.5 |

| Polymer | 1 | 2 | 3 |
|---|---|---|---|
| Compound A—Tensile, Elongation | 635–1,020 0 | 1,550–820 715–1,090 | 1,900–710 790–990 |
| Compound B | | | |

Compounding by the conventional method B appears to inhibit vulcanization but cross linking or vulcanization can be effected through carbon black alone.

*Example 3.*—A copolymer of isobutylene and cyclopentadienyl trichlorosilane was prepared in the proportions of Examples 2—(2). This polymer was dissolved in hexane to the extent of 3.9 g. polymer/100 cc. of solution.

A control "typly" cement which is normally employed in adhering recap Butyl treads to Butyl tire carcass was also prepared as follows:

| | Parts by wt. |
|---|---|
| Butyl rubber | 100 |
| Carbon black | 30 |
| Zinc oxide | 5 |
| Coray 230 oil | 5 |
| Sulfur | 2 |
| Tetramethyl thiuram disulfide | 1 |
| 2-mercapto-benzo-thiazole | 1 |

These ingredients were made up in a cement of 20% by weight of solids in hexane.

Test pieces of glass plate and pieces of glass filter cloth (100 mils thick) were washed carefully with naphtha and dried. These were coated four times each with the trichlorosilane copolymer cement with a half-hour drying period after each coat and rolled together. Other test pieces of plate and fabric were coated twice, each with the control cement (higher solids content) and dried and rolled together in the same fashion. These structures were placed in an air oven for one hour at 300° F., cooled and tested for adhesion on a Scott tester at 2 in. per minute. The results were as follows:

| Structure | Adhesion, #/linear inch | Separation |
|---|---|---|
| Trichlorosilane copolymer | 7 | Pulled fibers from fabric. |
| Control | 2 | Clean from glass plate. |

It is clear then that even with this coarse grade of glass fabric, marked improvement in adhesion to glass can be effected through the novel copolymer of the present invention.

The nature and objects of the present invention having been thus fully set forth and specific examples of the same given, what is claimed as new and useful and desired to be secured by Letters Patent is:

1. A solid copolymer of a cyclodienyl trichlorosilane having the general formula

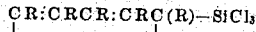

in which R is selected from the group consisting of hydrogen and alkyl and an unsaturated hydrocarbon.

2. A solid copolymer of a cyclodienyl trichlorosilane having the formula

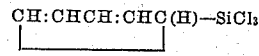

and an unsaturated hydrocarbon selected from the class consisting of vinyl aromatics, diolefins and olefins.

3. A solid copolymer of a cyclodienyl trichlorosilane having the general formula

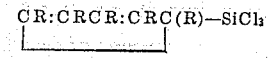

in which R is selected from the group consisting of hydrogen and alkyl and a vinyl aromatic.

4. A solid copolymer of a cyclodienyl trichlorosilane having the general formula

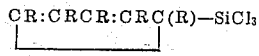

in which R is selected from the group consisting of hydrogen and alkyl and styrene.

5. A solid copolymer of a cyclodienyl trichlorosilane having the general formula

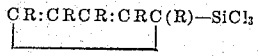

in which R is selected from the group consisting of hydrogen and alkyl and a diolefin.

6. A solid copolymer of a cyclodienyl trichlorosilane having the general formula

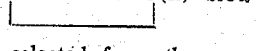

in which R is selected from the group consisting of hydrogen and alkyl and butadiene.

7. A solid copolymer of a cyclodienyl trichlorosilane having the general formula

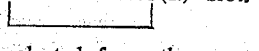

in which R is selected from the group consisting of hydrogen and alkyl and isoprene.

8. A solid copolymer of a cyclodienyl trichlorosilane having the general formula

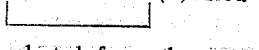

in which R is selected from the group consisting of hydrogen and alkyl and isobutylene.

9. A solid copolymer of a cyclopentadienyl trichlorosilane having the formula

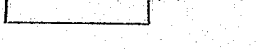

and isobutylene.

10. A process which comprises copolymerizing a mixture of a cyclodienyl trichlorosilane having the general formula

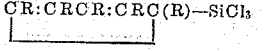

in which R is selected from the group consisting of hydrogen and alkyl and an unsaturated hydrocarbon in the presence of a Friedel-Crafts type catalyst dissolved in a non-complex forming, low freezing solvent at a temperature between −10° and −164° C.

11. A process which comprises copolymerizing a mixture of a cyclodienyl trichlorosilane having the formula

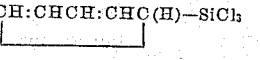

and an unsaturated hydrocarbon, selected from the group consisting of vinyl aromatics, diolefins and olefins, in the presence of a Friedel-Crafts type catalyst dissolved in a non-complex forming, low freezing solvent at a temperature between −10° and −164° C.

12. A process which comprises copolymerizing a mixture of a cyclodienyl trichlorosilane having the general formula

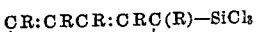

in which R is selected from the group consisting of hydrogen and alkyl and a vinyl aromatic in the presence of a Friedel-Crafts type catalyst dissolved in a non-complex forming, low freezing solvent at a temperature between —10° and —164° C.

13. A process which comprises copolymerizing a mixture of a cyclodienyl trichlorosilane having the formula

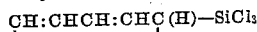

and styrene in the presence of a Friedel-Crafts type catalyst dissolved in a non-complex forming, low freezing solvent at a temperature between —10° and —164° C.

14. A process which comprises copolymerizing a mixture of a cyclodienyl trichlorosilane having the general formula

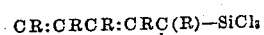

in which R is selected from the group consisting of hydrogen and alkyl and a diolefin in the presence of a Friedel-Crafts type catalyst dissolved in a non-complex forming, low freezing solvent at a temperature between —10° and —164° C.

15. A process which comprises copolymerizing a mixture of a cyclodienyl trichlorosilane having the formula

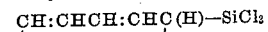

and butadiene in the presence of a Friedel-Crafts type catalyst dissolved in a non-complex forming, low freezing solvent at a temperature between —10° and —164° C.

16. A process which comprises copolymerizing a mixture of a cyclodienyl trichlorosilane having the formula

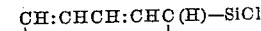

and isoprene in the presence of a Friedel-Crafts type catalyst dissolved in a non-complex forming, low freezing solvent at a temperature between —10° and —164° C.

17. A process which comprises copolymerizing a mixture of a cyclodienyl trichlorosilane having the general formula

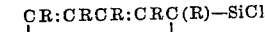

in which R is selected from the group consisting of hydrogen and alkyl and isobutylene in the presence of a Friedel-Crafts type catalyst dissolved in a non-complex forming, low freezing solvent at a temperature between —10° and —164° C.

18. A process which comprises copolymerizing a mixture of cyclopentadienyl trichlorosilane having the formula

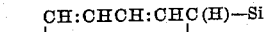

and isobutylene in the presence of aluminum chloride catalyst dissolved in methyl chloride at a temperature between —10° and —164° C.

19. A solid copolymer of a cyclopentadienyl trichlorosilane having the formula

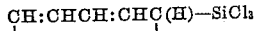

and an olefin.

20. A high molecular weight tough solid copolymer of about 1.4 to 5.9% of combined cyclopentadienyl trichlorosilane having the formula

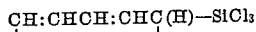

and about 98.6 to 94.1% of combined isobutylene.

21. Product according to claim 20 having a Staudinger molecular weight of about 98,000 to 128,000 and an iodine number of about 2.74 to 3.47.

22. Composition comprising about 100 parts by weight of the product defined in claim 21, and about 30 to 50 parts by weight of carbon black.

23. Composition according to claim 22, cured by heating.

24. A process which comprises copolymerizing a mixture of about 10 to 50 parts by weight of a cyclopentadienyl trichlorosilane having the formula

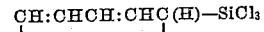

and about 50 to 90% by weight of an olefin, in the presence of a Friedel-Crafts type catalyst dissolved in a non-complex forming, low freezing solvent at a temperature between —10 and —164° C.

25. A process which comprises copolymerizing a mixture of about 10 to 40% by weight of a cyclopentadienyl trichlorosilane having the formula

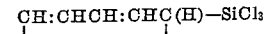

and about 90 to 60% by weight of isobutylene in the presence of methyl chloride as diluent, and in the presence of a catalyst comprising aluminum chloride dissolved in methyl chloride, at a temperature of about —100° C., to produce a tough copolymer having a Staudinger molecular weight of about 98,000 to 128,000, and containing about 1.4 to 5.9% of combined cyclopentadienyl trichlorosilane.

26. Process according to claim 25 followed by compounding about 100 parts by weight of the resulting copolymer with about 30 to 50 parts by weight of carbon black.

27. Process according to claim 26 followed by curing the resulting composition by heating.

References Cited in the file of this patent

UNITED STATES PATENTS 2,532,583    Tyron                 Dec. 5, 1950
2,667,501    Martin               Jan. 26, 1954

OTHER REFERENCES

Mark et al.: Physical Chemistry of High Polymeric Systems, Interscience, 1950, pp. 454–456.